(12) United States Patent
Sawanishi et al.

(10) Patent No.: US 10,081,074 B2
(45) Date of Patent: Sep. 25, 2018

(54) RESISTANCE SPOT WELDING DEVICE AND RESISTANCE SPOT WELDING METHOD

(71) Applicant: JFE STEEL CORPORATION, Tokyo (JP)

(72) Inventors: Chikaumi Sawanishi, Tokyo (JP); Yasuaki Okita, Tokyo (JP); Hiroshi Matsuda, Tokyo (JP); Rinsei Ikeda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 13 days.

(21) Appl. No.: 15/317,354

(22) PCT Filed: Jun. 5, 2015

(86) PCT No.: PCT/JP2015/002847
§ 371 (c)(1),
(2) Date: Dec. 8, 2016

(87) PCT Pub. No.: WO2015/190082
PCT Pub. Date: Dec. 17, 2015

(65) Prior Publication Data
US 2017/0113295 A1    Apr. 27, 2017

(30) Foreign Application Priority Data

Jun. 12, 2014    (JP) .................................. 2014-121728

(51) Int. Cl.
*B23K 11/25*    (2006.01)
*B23K 11/11*    (2006.01)
(Continued)

(52) U.S. Cl.
CPC ........... *B23K 11/252* (2013.01); *B23K 11/115* (2013.01); *B23K 11/257* (2013.01);
(Continued)

(58) Field of Classification Search
CPC ................... B23K 11/24–11/26; B23K 11/115
(Continued)

(56) References Cited

U.S. PATENT DOCUMENTS 5,892,197 A  *  4/1999  Goto .................... B23K 11/256
                                                                 219/110
6,057,523 A      5/2000  Fujii
(Continued)

FOREIGN PATENT DOCUMENTS

CN           1766587        5/2006
CN         101825580        9/2010
(Continued)

OTHER PUBLICATIONS

International Search Report and Written Opinion for International Application No. PCT/JP2015/002847, dated Sep. 1, 2015, 7 pages.
(Continued)

*Primary Examiner* — Michael Laflame, Jr.
(74) *Attorney, Agent, or Firm* — RatnerPrestia (57) ABSTRACT

A resistance spot welding device that joins predetermined parts to be welded includes: a storage configured to store a time variation of an instantaneous amount of heat generated per unit volume and a cumulative amount of heat generated per unit volume in test welding that precedes actual welding; and an adaptive controller and an electrode force controller configured to, in the case where the time variation of the instantaneous amount of heat generated per unit volume in the actual welding differs from a time variation curve stored as the target value, respectively control the current or a voltage during current passage and the electrode force to the parts to be welded to compensate for the difference within a remaining welding time so that the cumulative amount of
(Continued)

heat generated per unit volume in the actual welding matches the cumulative amount of heat generated per unit volume stored in the storage.

4 Claims, 4 Drawing Sheets

(51) Int. Cl.
  *B23K 101/00* (2006.01)
  *B23K 101/18* (2006.01)
  *B23K 103/04* (2006.01)

(52) U.S. Cl.
  CPC ...... *B23K 11/258* (2013.01); *B23K 2201/006* (2013.01); *B23K 2201/18* (2013.01); *B23K 2203/04* (2013.01)

(58) Field of Classification Search
  USPC ................................ 219/91.1–91.2, 108–111
  See application file for complete search history.

(56) References Cited

U.S. PATENT DOCUMENTS

| | | | |
|---|---|---|---|
| 6,130,396 | A | 10/2000 | Hasegawa |
| 2012/0248086 | A1 | 10/2012 | Watanabe |
| 2016/0008913 | A1 | 1/2016 | Okita |
| 2016/0008914 | A1 | 1/2016 | Okita |

FOREIGN PATENT DOCUMENTS

| | | |
|---|---|---|
| CN | 102665995 A | 9/2012 |
| EP | 0891836 A2 | 1/1999 |
| EP | 1044753 A2 | 10/2000 |
| JP | 05337657 A | 12/1993 |
| JP | 09216070 A | 8/1997 |
| JP | 09216071 | 8/1997 |
| JP | 1094883 | 4/1998 |
| JP | 1133743 | 2/1999 |
| JP | 2004058153 | 2/2004 |
| JP | 2008290098 | 12/2008 |
| JP | 2010149143 | 7/2010 |
| JP | 2010221284 | 10/2010 |
| JP | 2010240740 | 10/2010 |
| JP | 2010247215 | 11/2010 |
| JP | 2010269337 | 12/2010 |
| JP | 2011104628 | 6/2011 |
| JP | 2012011434 | 1/2012 |
| WO | 2014156290 | 10/2014 |
| WO | 2014136507 | 12/2014 |

OTHER PUBLICATIONS

Supplementary European Search Report for Application No. 15806604.3, dated Apr. 11, 2017, 7 pages.
Korean Office Action for Korean Application for Korean Application No. 2016-7032423, dated Nov. 13, 2017 with Concise Statement of Relevance of Office Action, 5 pages.
Chinese Office Action for Chinese Application No. 201580028189.8, dated May 4, 2018, with Concise Statement of Relevance of Office Action, 5 pages.

* cited by examiner

RESISTANCE SPOT WELDING DEVICE AND RESISTANCE SPOT WELDING METHOD

CROSS REFERENCE TO RELATED APPLICATIONS

This is the U.S. National Phase application of PCT/JP2015/002847, filed Jun. 5, 2015, which claims priority to Japanese Patent Application No. 2014-121728, filed Jun. 12, 2014, the disclosures of each of these applications being incorporated herein by reference in their entireties for all purposes.

TECHNICAL FIELD

The disclosure relates to a resistance spot welding device that can form an appropriate nugget by an adaptive control welding technique.

The disclosure also relates to a resistance spot welding method for performing welding using the resistance spot welding device.

BACKGROUND

Typically, overlapping steel sheets are joined by resistance spot welding which is one type of lap resistance welding.

Resistance spot welding is a method of squeezing two or more overlapping steel sheets by a pair of electrodes from above and below and, while applying an electrode force, passing a high welding current between the upper and lower electrodes for a short time to join the steel sheets. Heat generated from the resistance to the flow of the high welding current is utilized to obtain a spot weld. The spot weld is called a nugget, and results from the overlapping steel sheets melting and solidifying at their contact portion when the current flows through the steel sheets. The steel sheets are thus spot-joined.

For good weld quality, it is important to form the nugget with a diameter in an appropriate range. The nugget diameter depends on the welding condition such as welding current, welding time, electrode shape, and electrode force. To achieve an appropriate nugget diameter, the welding condition needs to be set appropriately according to the parts-to-be-welded condition such as the material, sheet thickness, and number of overlapping sheets of the parts to be welded.

In vehicle manufacturing, for example, spot welding is performed at several thousand points per vehicle, and parts to be welded (workpieces) conveyed one after another need to be welded. Here, if the parts-to-be-welded condition such as the material, sheet thickness, and number of overlapping sheets of the parts to be welded is the same at each welding location, the same welding condition such as welding current, welding time, and electrode force can be used to obtain the same nugget diameter. In continuous welding, however, as welding is performed multiple times, the contact surfaces of the electrodes with the parts to be welded wear gradually and the contact areas between the electrodes and the parts to be welded widen gradually. When the same welding current as in the initial welding is passed in such a state where the contact areas have widened, the current density in the parts to be welded decreases and the temperature rise of the weld drops, which leads to a smaller nugget diameter. Accordingly, the electrodes are dressed or replaced every several hundred to several thousand welding points, to prevent the electrode tip diameter from increasing excessively.

A resistance welding device having a function (stepper function) of increasing the welding current after a predetermined number of welding operations to compensate for a decrease in current density associated with electrode wear has been conventionally used, too. To use the stepper function, the aforementioned welding current change pattern needs to be set appropriately beforehand. This, however, requires considerable time and cost as the welding current change patterns corresponding to numerous parts-to-be-welded conditions and welding conditions need to be derived through tests and the like. Besides, since the state of progress of electrode wear varies in actual work, the welding current change pattern set beforehand may not always be appropriate.

In the case where disturbances are present during welding such as when a point that has already been welded (existing weld) is present near the current welding point or when the parts to be welded have significant surface roughness and a contact point of the parts to be welded is present near the welding point, part of the current diverts into such an existing weld or contact point during welding. Even when welding is performed under a predetermined condition in this state, the current density at the position to be welded which is directly above and below the electrodes decreases, and so a nugget of a required diameter cannot be obtained. To compensate for such an insufficient amount of heat generated and obtain a nugget of a required diameter, a high welding current needs to be set beforehand.

Moreover, in the case where the surroundings of the welding point are firmly restrained due to surface roughness, member shape, etc., a larger sheet gap between the steel sheets causes a smaller contact area of the steel sheets, which may hinder the obtainment of a nugget of a required diameter or facilitate splashing.

The following techniques have been proposed to solve the problems stated above.

For example, JP H9-216071 A (PTL 1) describes a control unit of a resistance welder that compares an estimated temperature distribution of a weld and a target nugget and controls the output of the welder to obtain the set nugget.

JP H10-94883 A (PTL 2) describes a welding condition control method for a resistance welder of detecting the welding current and the voltage between tips, simulating a weld through heat transfer calculation, and estimating the nugget formation state to achieve good welding.

JP H11-33743 A (PTL 3) describes a welding system that calculates, from the sheet thickness of parts to be welded and the welding time, the cumulative amount of heat generated per unit volume with which good welding of the parts to be welded is possible, and adjusts the welding current or voltage to generate the calculated amount of heat per unit volume and per unit time. According to PTL 3, the use of the welding system enables good welding regardless of the type of the parts to be welded or the wear state of the electrodes.

JP 2004-58153 A (PTL 4) describes a welding method of calculating a curve that takes the value of the power and the current or the square of the current per half cycle during current passage, determining the nugget formation state based on the change of the curve, and either adjusting the current or the electrode force in the subsequent cycles or terminating the current.

CITATION LIST

Patent Literatures

PTL 1: JP 149-216071 A
PTL 2: JP H10-94883 A

PTL 3: JP H11-33743 A
PTL 4: JP 2004-58153 A

SUMMARY

Technical Problem

However, the resistance spot welding by the control unit of a resistance welder described in PTL 1 and the welding condition control method for a resistance welder described in PTL 2 needs complex calculation to estimate the nugget temperature based on a heat transfer model (heat transfer simulation). This requires a welding control unit that is not only complex in structure but also expensive.

The resistance spot welding by the welding system described in PTL 3 enables good welding constantly regardless of electrode wear, by adjusting the cumulative amount of heat generated to the target value. However, in the case where the set parts-to-be-welded condition and the actual parts-to-be-welded condition are significantly different, e.g. in the case where disturbances such as the aforementioned existing weld or sheet gap between the steel sheets are present nearby and significantly affect the welding point, even when the final cumulative amount of heat generated can be adjusted to the target value, there is a possibility that the heat generation and current patterns, namely, the time variations of the temperature distribution and current density distribution of the weld, deviate significantly from the target patterns for obtaining a good weld. This leads to a failure to obtain a required nugget diameter, or splashing.

For example, when a contact point of the parts to be welded is present near the welding point and there is a large sheet gap between the parts to be welded, the interelectrode resistance increases, which causes a decrease in current and makes it impossible to ensure the required nugget diameter.

The welding method described in PTL 4 monitors the change of the curve of the current increase/decrease process per half cycle. Such a welding method is supposed to be used in AC-powered welding, and cannot be used in DC-powered welding. Besides, although PTL 4 mentions the adjustment of any of the current, electrode force, and welding time as the means for suppressing splashing, PTL 4 fails to explain the necessity to adjust each of these parameters.

Further, while the techniques disclosed in PTL 1 to PTL 4 are all effective for the change in the case where the electrode tips wear, these techniques do not take into consideration the situations where the effect of a current shunting or a sheet gap is significant because of, for example, the presence of an existing weld nearby or the presence of a contact point due to surface roughness between steel sheets. Hence, the aforementioned adaptive control welding cannot be accurately performed in some cases.

It could be helpful to provide a resistance spot welding device that can obtain a nugget of an appropriate diameter without splashing even under a special welding condition as mentioned above, and a resistance spot welding method using the resistance spot welding device.

Solution to Problem

As a result of conducting intensive study, we discovered the following.

In resistance spot welding by adaptive control welding, there is a possibility that the heat generation and current patterns, namely, the time variations of the temperature distribution and current density distribution of the weld, deviate significantly from the target patterns for obtaining a good weld. This leads to a failure to obtain a required nugget diameter, or splashing.

Before and in an initial stage of resistance spot welding, the resistance between the steel sheets at the welding point is high, and the current passage area has not been secured yet. Accordingly, for example when a contact point of the parts to be welded is present near the welding point and there is a large sheet gap between the parts to be welded, a current shunting to the contact point occurs and the contact diameter of the parts to be welded at the welding point decreases, as a result of which the interelectrode resistance increases depending on the sheet combination. This causes the device to falsely recognize that the cumulative amount of heat generated at the welding point is excessively large. As a result, the current under adaptive control is decreased, making it impossible to obtain the required nugget diameter. Alternatively, in the case where the amount of current shunting to the contact point increases and the interelectrode resistance decreases, the current is increased in the state where the contact diameter of the parts to be welded is small. This raises the risk of splashing.

Even when the sheet gap between the parts to be welded is small, an attempt to adjust the cumulative amount of heat generated in actual welding to the cumulative amount of heat generated in test welding in the case where the effect of current shunting is significant leads to a considerable increase of the current, because the current passage area between the parts to be welded has not been secured. This causes marked heat generation not between the steel sheets but between the electrodes and the steel sheets, and results in a large difference in heat generation pattern between the actual welding and the test welding.

In view of the above, we discovered that it is effective to control not only the current or the voltage during the current passage, but also the electrode force to the parts to be welded during the current passage according to need. In detail, we discovered that, by forming and growing a nugget while securing a predetermined current passage area through control of the electrode force to the parts to be welded, the desired result can be advantageously achieved regardless of electrode wear or disturbances.

The disclosure is based on the aforementioned discoveries.

We thus provide the following:

1. A resistance spot welding device that squeezes parts to be welded by a pair of electrodes and, while applying an electrode force, passes a current through the parts to be welded to join the parts to be welded, the parts to be welded being a plurality of overlapping metal sheets, the resistance spot welding device including: a storage configured to store an amount of time variation of an instantaneous amount of heat generated per unit volume as a time variation curve and to store a cumulative amount of heat generated per unit volume, both the amount of time variation and the cumulative amount of heat being calculated from an electrical property between the electrodes in the case of forming an appropriate nugget by passing a current by constant current control in test welding that precedes actual welding; an adaptive controller configured to start the actual welding using the time variation curve stored in the storage as a target and, in the case where the time variation of the instantaneous amount of heat generated per unit volume in the actual welding differs from the time variation curve, control the current or a voltage during current passage to compensate for the difference within a remaining welding time so that the cumulative amount of heat generated per unit volume in the actual welding matches the cumulative amount of heat generated per unit volume stored in the storage; and an electrode force controller configured to control the electrode force to the parts to be welded in cooperation with the adaptive controller to compensate for the difference within a remaining welding time so that the cumulative amount of heat generated per unit volume in the actual welding matches the cumulative amount of heat generated per unit volume stored in the storage.

2. The resistance spot welding device according to the foregoing 1, wherein the electrode force controller is configured to increase or decrease a subsequent electrode force in the actual welding, depending on a difference between the cumulative amount of heat generated per unit volume in the actual welding and the cumulative amount of heat generated per unit volume in the test welding when a predetermined time has elapsed from start of the current passage.

3. The resistance spot welding device according to the foregoing 2, wherein the electrode force controller is configured to control a time from the start of the current passage to when the electrode force controller starts the control of the electrode force in the actual welding to fall within a range of 0.1 cyc to 10 cyc.

4. The resistance spot welding device according to the foregoing 2 or 3, wherein the electrode force controller is configured a time from when the electrode force controller starts the control of the electrode force to when the electrode force controller ends the control of the electrode force in the actual welding to fall within a range of 1 cyc to 30 cyc.

5. A resistance spot welding method for performing welding using the resistance spot welding device according to any one of the foregoing 1 to 4.

Advantageous Effect

With the disclosure, a good nugget can be obtained without splashing even under a welding condition where the electrodes have worn or the effect of disturbances such as a current shunting or a sheet gap is significant.

DETAILED DESCRIPTION

The following describes one of the disclosed embodiments in detail.

Figure 1:
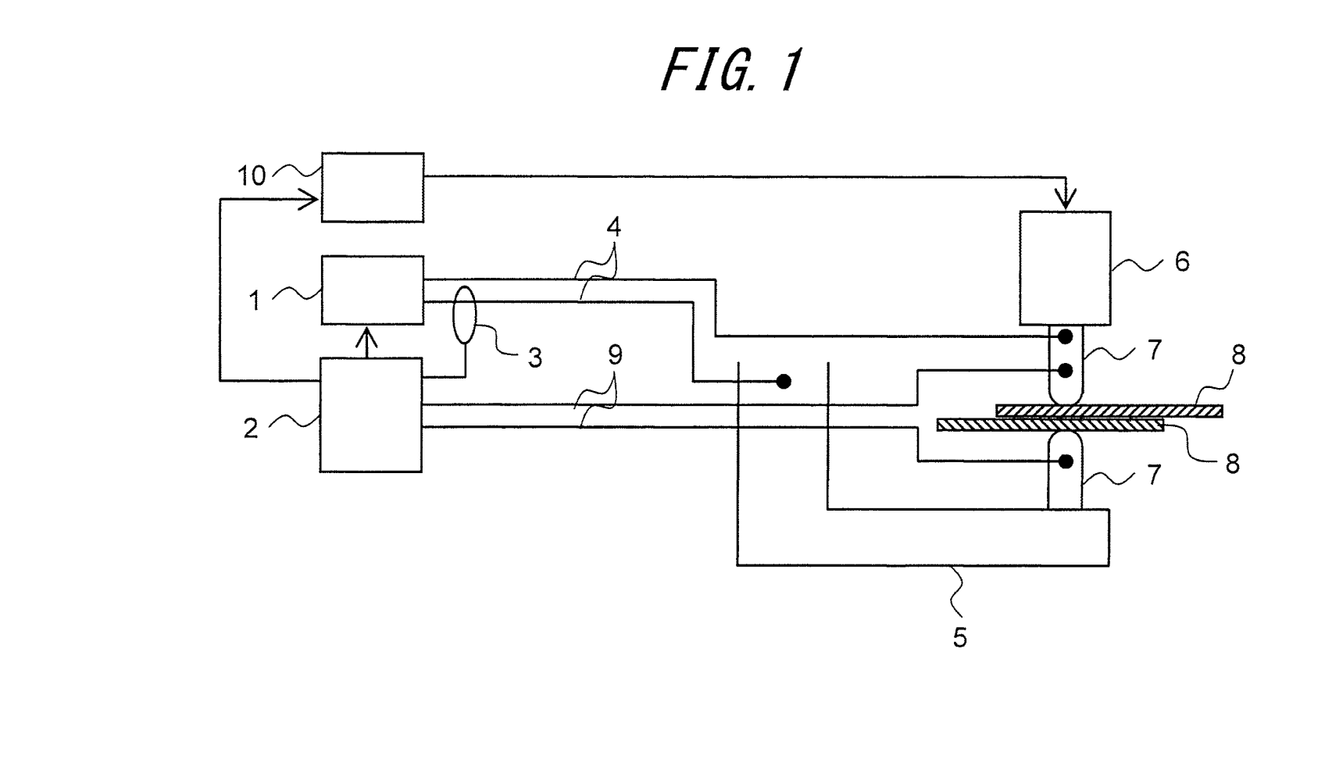
FIG. 1 is a schematic diagram illustrating a resistance spot welding device according to one of the disclosed embodiments.

FIG. 1 is a schematic diagram illustrating a resistance spot welding device according to one of the disclosed embodiments.

In FIG. 1, reference sign 1 is a resistance spot welding power source, 2 is an adaptive controller that provides a control signal to the resistance spot welding power source 1, 3 is a welding current detector that outputs a detected signal to the adaptive controller 2, and 4 is a secondary conductor connected to the output of the resistance spot welding power source 1 and also connected to electrodes 7 to pass a current to the electrodes 7.

Reference sign 5 is a lower arm and 6 is a force cylinder, which are attached to the respective electrodes 7. The electrodes 7 squeeze parts to be welded 8. Reference sign 9 is an interelectrode voltage detection line attached to the electrodes 7, and connected to the adaptive controller 2. The adaptive controller 2 can switch between a test welding mode and an actual welding mode.

Reference sign 10 is an electrode force controller that outputs a signal to the force cylinder 6 according to the adjustment of the current or voltage by the adaptive controller 2, to change the electrode force to the parts to be welded.

The resistance spot welding device according to one of the disclosed embodiments also includes a storage (not illustrated) that stores the amount of time variation of the instantaneous amount of heat generated per unit volume as a time variation curve and that stores the cumulative amount of heat generated per unit volume, both the amount of time variation and the cumulative amount of heat being calculated from the interelectrode electrical property in the case of forming an appropriate nugget by passing a current by constant current control in the test welding.

In the test welding mode, the adaptive controller 2 calculates the instantaneous amount of heat generated per unit volume from the current received from the welding current detector 3 and the voltage received from the interelectrode voltage detection line 9, and stores the amount of time variation of the instantaneous amount of heat generated per unit volume and the cumulative amount of heat generated per unit volume in the storage.

In the actual welding mode, having started current passage under the welding condition of the test welding, the adaptive controller 2 calculates, per sampling time, the instantaneous amount of heat generated from the current received from the welding current detector 3 and the voltage received from the interelectrode voltage detection line 9, and compares the instantaneous amount of heat generated per unit time and the instantaneous amount of heat generated stored in the storage. When these values differ from each other, the current or the voltage and further the electrode force are controlled depending on the difference. In other words, the welding current or voltage adaptively controlled by the adaptive controller 2 is passed through the parts to be welded 8 and the electrode force controlled by the electrode force controller 10 is applied to the parts to be welded 8 so that the cumulative amount of heat generated in the actual welding matches the cumulative amount of heat generated stored in the storage.

The following describes the control procedure of the resistance spot welding method using the resistance spot welding device according to one of the disclosed embodiments.

The test welding is described first.

In the state where there is no current shunting to an existing weld or sheet gap, preliminary welding is performed by constant current control under various conditions using parts to be welded of the same steel type and thickness as the parts to be welded used in the actual welding, to find an optimal condition (current, voltage, welding time, and electrode force) in the test welding. A suitable welder is an inverter DC resistance spot welder, and suitable electrodes are chromium copper electrodes or alumina-dispersed copper electrodes.

The test welding is then performed under the optimal condition, and the amount of time variation of the instantaneous amount of heat generated per unit volume and the cumulative amount of heat generated per unit volume calculated from the interelectrode electrical property in the test welding are stored in the storage. The interelectrode electrical property in the disclosure means the interelectrode resistance or the interelectrode voltage.

The current pattern in the test welding can be divided into two or more steps. For example, the current pattern can be divided in two steps at the point of time when a weld fusion zone begins to form between the steel sheets as the parts to be welded (when a current path begins to form directly above and below the electrodes).

After the test welding, the actual welding is performed. The actual welding is started using the time variation curve obtained in the test welding as a target. If the time variation of the instantaneous amount of heat generated follows the time variation curve, the welding is continued without change and completed. If the time variation of the instantaneous amount of heat generated in the actual welding differs from the time variation curve, on the other hand, adaptive control welding of controlling the current passage amount, i.e. the current or the voltage, depending on the difference is carried out to compensate for the difference within the remaining welding time of the step so that the cumulative amount of heat generated per unit volume in the actual welding (hereafter simply referred to as "cumulative amount of heat generated in the actual welding") matches the cumulative amount of heat generated per unit volume stored in the storage in the test welding (hereafter simply referred to as "cumulative amount of heat generated in the test welding").

Simultaneously with this current passage amount control, the welding method also controls the electrode force to the parts to be welded so that the cumulative amount of heat generated in the actual welding matches the cumulative amount of heat generated in the test welding.

Thus, the required cumulative amount of heat generated can be ensured to obtain an appropriate nugget diameter even in the state where the electrode tips have worn or the effect of disturbances such as a current shunting or a sheet gap is significant.

The method of calculating the amount of heat generated per unit volume is not particularly limited. PTL 3 describes an example of the method, which may be used in this disclosure. The following is the procedure of calculating the cumulative amount Q of heat generated per unit volume according to this method.

Let t be the total thickness of two parts to be welded, r be the electrical resistivity of the parts to be welded, V be the interelectrode voltage, I be the welding current, and S be the contact area of the electrodes and the parts to be welded. In this case, the welding current passes through a columnar portion whose cross-sectional area is S and thickness is t, to generate heat by resistance. The amount q of heat generated per unit volume and per unit time in the columnar portion is given by the following Equation (1):

$$q=(V \cdot I)/(S \cdot t) \tag{1}$$

The electrical resistance R of the columnar portion is given by the following Equation (2):

$$R=(r \cdot t)/S \tag{2}$$

Solving Equation (2) for S and substituting the solution into Equation (1) yields the amount q of heat generated as shown by the following Equation (3):

$$q=(V \cdot I \cdot R)/(r \cdot t^2)=(V^2)/(r \cdot t^2) \tag{3}$$

As is clear from Equation (3), the amount q of heat generated per unit volume and per unit time can be calculated from the interelectrode voltage V, the total thickness t of the parts to be welded, and the electrical resistivity r of the parts to be welded, and is not affected by the contact area S of the electrodes and the parts to be welded.

Although the amount of heat generated is calculated from the interelectrode voltage V in Equation (3), the amount q of heat generated may be calculated from the interelectrode current I. The contact area S of the electrodes and the parts to be welded need not be used in this case, too.

By cumulating the amount q of heat generated per unit volume and per unit time for the welding time, the cumulative amount Q of heat generated per unit volume for the welding is obtained. As is clear from Equation (3), the cumulative amount Q of heat generated per unit volume can also be calculated without using the contact area S of the electrodes and the parts to be welded.

Although the above describes the case of calculating the cumulative amount Q of heat generated by the method described in PTL 3, the cumulative amount Q may be calculated by any other method.

As described above, in the case where the time variation of the instantaneous amount of heat generated per unit volume in the actual welding differs from the reference time variation curve, the welding method controls the current or the voltage and further controls the electrode force during the current passage, to compensate for the difference within the remaining welding time so that the cumulative amount of heat generated in the actual welding matches the cumulative amount of heat generated in the test welding. This makes it possible to form and grow a nugget while securing a predetermined current passage area regardless of disturbances, and prevent the aforementioned false recognition of the amount of heat generated due to a sheet gap or change in heat generation pattern due to a current shunting.

The index for the electrode force control is the difference in the amount of heat generated between the actual welding and the test welding, and particularly the difference in the cumulative amount of heat generated per unit volume when a predetermined time has elapsed from the start of the current passage between the actual welding and the test welding. For example, in the case where the cumulative amount of heat generated per unit volume when the predetermined time has elapsed from the start of the current passage in the actual welding is greater than the cumulative amount of heat generated per unit volume when the predetermined time has elapsed from the start of the current passage in the test welding, the subsequent electrode force is increased depending on the difference.

Although the current control is effective in changing the current passage area, its effect of changing the contact diameter is insufficient. The electrode force control can compensate for the decrease of the contact diameter during the current passage caused by disturbances, so that the nugget formation process by the current control can be brought into agreement with that of the test welding.

In the case where the cumulative amount of heat generated per unit volume when the predetermined time has elapsed from the start of the current passage in the actual welding is less than the cumulative amount of heat generated per unit volume when the predetermined time has elapsed from the start of the current passage in the test welding, the subsequent electrode force is decreased depending on the difference.

The cumulative amount of heat generated per unit volume when the predetermined time has elapsed from the start of the current passage in the test welding can be obtained by cumulating the instantaneous amount of heat generated per unit volume for the predetermined time from the start of the current passage in the test welding.

The time from the start of the current passage to the start of the electrode force control, i.e. the elapsed time of the cumulative amount of heat generated as the electrode force control index from the start of the current passage, is preferably in the range of 0.1 cyc to 10 cyc. The aforementioned advantageous effect can be sufficiently achieved in this way. This is because, when controlling the nugget diameter, it is important to bring the current passage area in the nugget formation closer to the current passage area in the test welding. If the time from the start of the current passage is less than 0.1 cyc, the electrical resistance varies widely even with the same sheet combination and the same work state, and therefore it is difficult to compensate for the difference in the instantaneous amount of heat generated per unit volume between the actual welding and the test welding up to this point and match the cumulative amount of heat generated in the actual welding to the cumulative amount of heat generated in the test welding. If the time from the start of the current passage exceeds 10 cyc, the formation and growth of the nugget begins before changing the electrode force, and so the aforementioned advantageous effect cannot be achieved. In the case where the sheet combination has a wide resistance variation or the effect of disturbances is significant, the time is preferably in the range of 0.3 cyc to 5 cyc.

The time for changing the electrode force depending on the difference in the cumulative amount of heat generated between the actual welding and the test welding is preferably in the range of 1 cyc to 30 cyc, to sufficiently achieve the aforementioned advantageous effect. If the time is less than 1 cyc, the current passage area cannot be secured by increasing the electrode force. If the time exceeds 30 cyc, the electrode force increases during the nugget growth, which may cause lower heat generation efficiency. In the case where the sheet combination has a wide resistance variation or the effect of disturbances is significant, the time is preferably in the range of 2 cyc to 20 cyc.

Even when the amount of change of the electrode force is kept constant from the start to end of the electrode force control, the advantageous effect can be achieved to a certain extent. In such a sheet combination or work state where the effect of the current passage area on the nugget formation during the current passage is particularly significant such as a sheet combination of three or more sheets with a high sheet thickness ratio or a state where there is a very large sheet gap between the steel sheets, however, the aforementioned advantageous effect can be further enhanced by sequentially controlling the electrode force during the current passage while simultaneously controlling the current.

The parts to be welded in the disclosure are not particularly limited. The disclosed technique is applicable to the welding of steel sheets having various strengths from mild steel to ultra high tensile strength steel, various coated steel sheets, and light metal sheets of aluminum alloys and the like. The disclosed technique is also applicable to sheet combinations of three or more sheets. Moreover, a subsequent current may be applied to heat-treat the weld after the current for nugget formation.

Examples

The following describes examples according to the disclosure.

Figure 2:
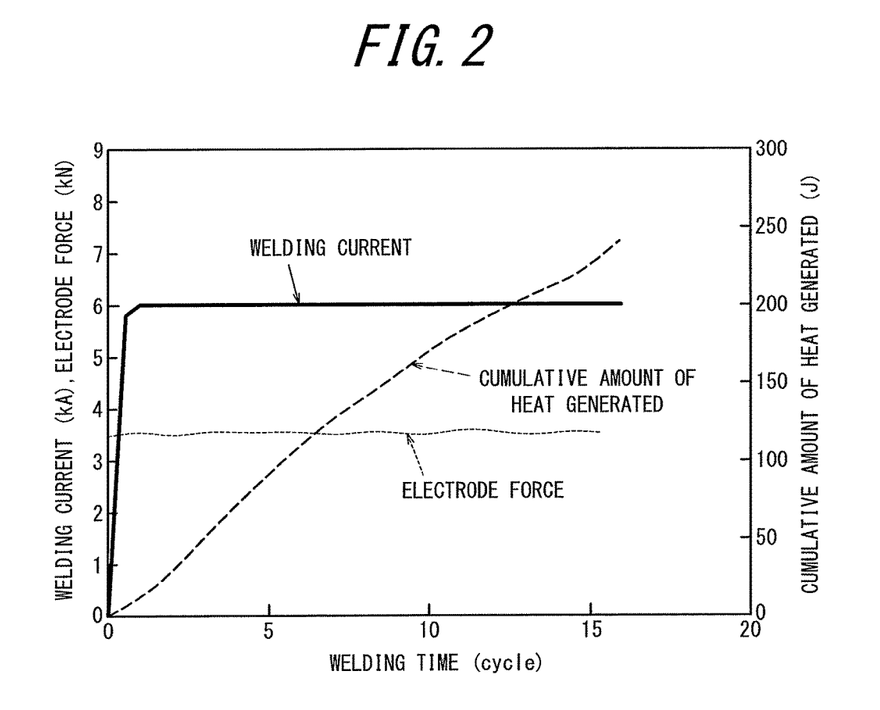
FIG. 2 is a diagram illustrating the changes of the welding current, electrode force, and cumulative amount of heat generated when the resistance spot welding device according to one of the disclosed embodiments performs test welding.

Cold rolled steel sheets of 590 MPa class and 980 MPa class (1.6 mm in sheet thickness) were used as the parts to be welded. Two parts to be welded were overlapped, and subjected to preliminary welding by constant current control in the state where no gap or current shunting to an existing weld was present, to determine a welding condition for obtaining an appropriate nugget diameter. An inverter DC resistance spot welder was used as the welder, and chromium copper electrodes with 6 mm face diameter DR-shaped tips were used as the electrodes. The welding condition was an electrode force of 3.5 kN, a welding current of 6.0 kA, and a welding time of 16 cyc (50 Hz (hereafter all time periods are expressed in the number of cycles at 50 Hz)). The resistance spot welding device as illustrated in FIG. 1 was used to perform the test welding under the aforementioned welding condition, and the amount of time variation of the instantaneous amount of heat generated per unit volume and the cumulative amount of heat generated per unit volume were stored. The nugget diameter obtained as a result was approximately 5.0 mm ($=4\sqrt{t}$ where t is the sheet thickness). FIG. 2 illustrates the changes of the welding current, electrode force, and cumulative amount of heat generated in this case.

Next, the actual welding was performed under the following condition.

Figure 3:
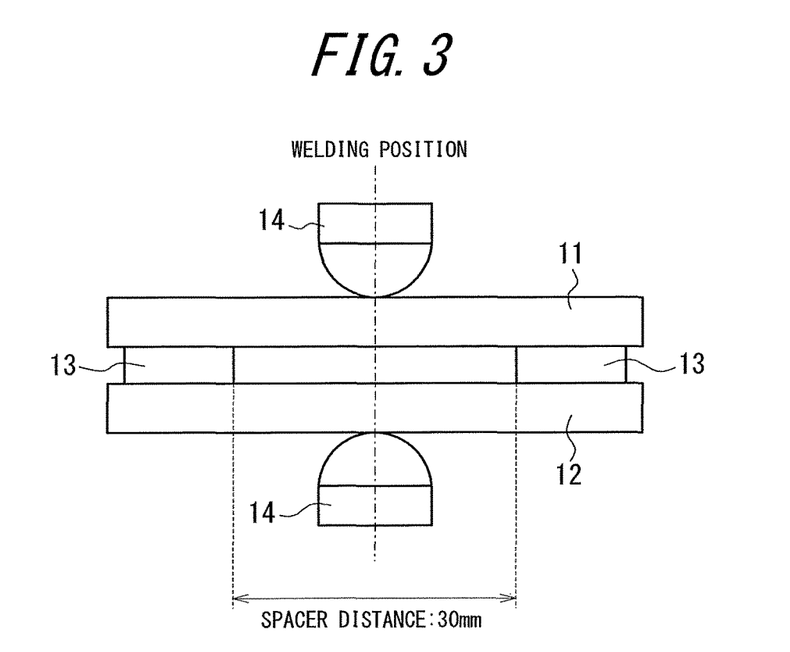
FIG. 3 is a schematic diagram illustrating an example of a resistance spot welding method in the state where there is a sheet gap between parts to be welded.

Spacer steel sheets 13 (1.5 mm in sheet thickness and 30 mm in spacer distance) were inserted between parts to be welded 11 and 12 (1.6 mm in sheet thickness), and the resistance spot welding device as illustrated in FIG. 1 was used to perform resistance spot welding with reference to the aforementioned test welding, as illustrated in FIG. 3. In detail, resistance spot welding was performed with reference to the time variation curve of the instantaneous amount of heat generated per unit volume obtained in the test welding. The section during which the electrode force control was performed was five cycles from first cycle to sixth cycle after the start of the current passage. Reference sign 14 in FIG. 3 is electrodes.

The nugget diameter obtained as a result was 5.2 mm, which was substantially the same as that in the test welding. Besides, no splashing occurred.

Figure 4:
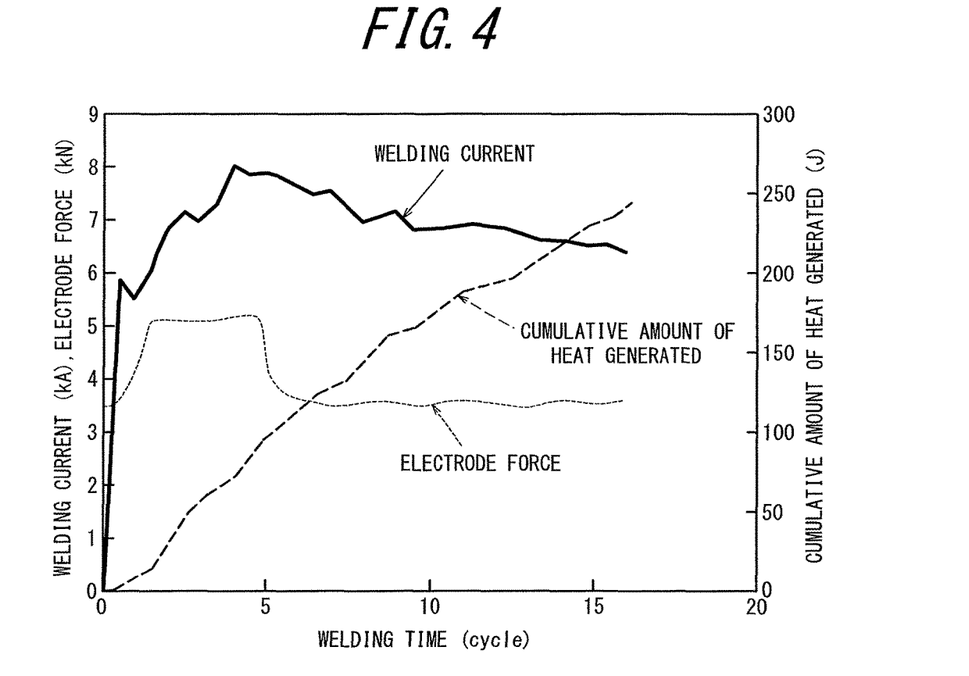
FIG. 4 is a diagram illustrating the changes of the welding current, electrode force, and cumulative amount of heat generated when the resistance spot welding device according to one of the disclosed embodiments performs adaptive control welding while controlling the electrode force.

FIG. 4 illustrates the changes of the welding current, electrode force, and cumulative amount of heat generated in this case.

Under this welding condition, the resistance in the initial stage of the current passage increased due to the sheet gap, and accordingly the electrode force was increased to about 5 kN in the electrode force control section.

Table 1 shows the results of welding with various sheet combinations and work conditions.

In condition Nos. 1, 2, 5, and 7, the resistance spot welding device as illustrated in FIG. 1 was used to perform resistance spot welding while controlling the current and the electrode force. In condition Nos. 3, 4, and 6, resistance spot welding was performed without controlling the electrode force. In condition No. 7, the current pattern of the test welding was divided into two steps of a first step and a second step, and a cooling time was provided between the steps. In the test welding in condition No. 7, the same electrode force was used in the first and second steps.

Assuming the target nugget diameter in the test welding to be $4\sqrt{t}$, each of the conditions was evaluated as good if the nugget diameter was 3.5√t or more and no splashing occurred, and poor if the nugget diameter was less than 3.5√t or splashing occurred.

TABLE 1

| Condition No. | Steel sheet strength (MPa class) | Sheet thickness (mm) | Electrode force* (kN) | First step current* (kA) | First step welding time* (cycle) | Cooling time (cycle) | Second step current* (kA) | Second step welding time* (cycle) | Spacer thickness (mm) | Spacer distance (mm) | Electrode force control start time (cycle) | Electrode force control end time (cycle) | Control method | Evaluation | Remarks |
|---|---|---|---|---|---|---|---|---|---|---|---|---|---|---|---|
| 1 | 590 | 1.6 | 3.5 | 7.0 | 16 | — | — | — | 1.5 | 30 | 1 | 6 | Adaptive control (current) + electrode force control | Good | Example |
| 2 | 590 | 1.8 | 3.5 | 7.2 | 18 | — | — | — | 1.5 | 40 | 0.5 | 10 | Adaptive control (current) + electrode force control | Good | Example |
| 3 | 590 | 1.6 | 3.5 | 7.0 | 16 | — | — | — | 1.5 | 30 | — | — | Constant current control (constant electrode force) | Poor | Comparative Example |
| 4 | 590 | 1.6 | 3.5 | 7.0 | 16 | — | — | — | 1.5 | 30 | — | — | Adaptive control (current) (constant electrode force) | Poor | Comparative Example |
| 5 | 980 | 1.6 | 3.5 | 6.0 | 16 | — | — | — | 1.0 | 40 | 0.1 | 30 | Adaptive control (current) + electrode force control | Good | Example |
| 6 | 590 | 1.6 | 3.5 | 7.0 | 16 | — | — | — | 1.5 | 30 | — | — | Adaptive control (current) (constant electrode force) | Poor | Comparative Example |
| 7 | 1180 | 1.6 | 5.0 | 5.0 | 6 | 4 | 7.5 | 10 | 1.0 | 40 | 4 | 16 | Adaptive control (current) + electrode force control | Good | Example |

*indicating electrode force to parts to be welded, current, or welding time in test welding.

As shown in the table, the resistance spot welding performed using the resistance spot welding device according to the disclosure produced the result evaluated as good with any sheet combination and work condition.

REFERENCE SIGNS LIST

1 resistance spot welding power source
2 adaptive controller that provides control signal to resistance spot welding power source
3 welding current detector
4 secondary conductor connected to output of resistance spot welding power source
5 lower arm
6 force cylinder
7 electrode
8 part to be welded
9 interelectrode voltage detection line
10 electrode force controller
11, 12 part to be welded
13 spacer
14 electrode

The invention claimed is:

1. A resistance spot welding device that squeezes parts to be welded by a pair of electrodes and, while applying an electrode force, passes a current through the parts to be welded to join the parts to be welded, the parts to be welded being a plurality of overlapping metal sheets, the resistance spot welding device comprising:

a storage configured to store an amount of time variation of an instantaneous amount of heat generated per unit volume as a time variation curve and to store a cumulative amount of heat generated per unit volume, both the amount of time variation and the cumulative amount of heat being calculated from an electrical property between the electrodes in the case of forming an appropriate nugget by passing a current by constant current control in test welding that precedes actual welding;

an adaptive controller configured to start the actual welding using the time variation curve stored in the storage as a target and, in the case where the time variation of the instantaneous amount of heat generated per unit volume in the actual welding differs from the time variation curve, control the current or a voltage during current passage to compensate for the difference within a remaining welding time so that the cumulative amount of heat generated per unit volume in the actual welding matches the cumulative amount of heat generated per unit volume stored in the storage; and an electrode force controller configured to control the electrode force to the parts to be welded in cooperation with the adaptive controller to compensate for the difference within a remaining welding time so that the cumulative amount of heat generated per unit volume in the actual welding matches the cumulative amount of heat generated per unit volume stored in the storage, wherein the electrode force controller is configured to increase or decrease a subsequent electrode force in the actual welding, depending on a difference between the cumulative amount of heat generated per unit volume in the actual welding and the cumulative amount of heat generated per unit volume in the test welding when predetermined tinge has elapsed from start of the current passage, and the electrode force controller is configured to control a time from the start of the current passage to when the electrode force controller starts the control of the electrode force in the actual welding to fall within a range of 0.1 cycles to 10 cycles.

2. The resistance spot welding device according to claim 1,
wherein the electrode forte controller is configured a time from when the electrode force controller starts the control of the electrode force to when the electrode force controller ends the control of the electrode force to fall within the actual welding in a range of 1 cycle to 30 cycles.

3. A resistance spot welding method for performing welding using the resistance spot welding device according to claim 1.

4. A resistance spot welding method for performing welding using the resistance spot welding device according to claim 2.

* * * * *